United States Patent
Bantupalli et al.

(10) Patent No.: US 12,489,296 B1
(45) Date of Patent: Dec. 2, 2025

(54) ENERGY STORAGE SYSTEM DISPATCH STRATEGY FOR MULTIPLE NON-ENERGY-STORAGE SYSTEMS WITH CHARGE RESTRICTIONS

(71) Applicant: Caterpillar Inc., Peoria, IL (US)

(72) Inventors: Manoj Kumar Bantupalli, Vizianagaram (IN); Ranjay Singh, Kanpur (IN); Srideep Chatterjee, Bhopal (IN); Sowmya Nagesh, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/800,429

(22) Filed: Aug. 12, 2024

(51) Int. Cl.
H02J 3/32 (2006.01)
H02J 3/38 (2006.01)
H02J 7/00 (2006.01)

(52) U.S. Cl.
CPC .......... H02J 3/32 (2013.01); H02J 3/381 (2013.01); H02J 7/0048 (2020.01); H02J 7/00712 (2020.01)

(58) Field of Classification Search
CPC .... H02J 3/32; H02J 7/00; H02J 7/0048; H02J 7/00712; H02J 3/38; H02J 3/381
See application file for complete search history.

(56) References Cited

U.S. PATENT DOCUMENTS

| 11,888,334 B2 | 1/2024 | Sergott et al. |
| 2025/0055307 A1* | 2/2025 | O'Neill .................. H02J 3/003 |

FOREIGN PATENT DOCUMENTS

| CN | 107017625 A | 8/2017 |
| CN | 113131503 A | 7/2021 |
| CN | 115714393 A | 2/2023 |
| CN | 117439058 A | 1/2024 |

* cited by examiner

Primary Examiner — Robert L Deberadinis
(74) Attorney, Agent, or Firm — Harrity & Harrity LLP

(57) ABSTRACT

A microgrid controller of a microgrid includes one or more memories configured to store a plurality of state-of-charge (SOC) setpoints corresponding to one or more energy storage systems (ESSs), a lower dispatch threshold that varies based on the plurality of SOC setpoints, and an upper dispatch threshold that varies based on the plurality of SOC setpoints. The microgrid controller is configured to calculate a total load allocated to a plurality of energy resource systems, measure a current SOC of the one or more ESSs, determine an aggregate output power of one or more non-ESSs based on a relationship of the total load relative to the lower dispatch threshold and the upper dispatch threshold for the current SOC, configure the one or more non-ESSs to provide the aggregate output power, and set the one or more ESSs into one of a plurality of operation states based on the relationship.

20 Claims, 5 Drawing Sheets

ENERGY STORAGE SYSTEM DISPATCH STRATEGY FOR MULTIPLE NON-ENERGY-STORAGE SYSTEMS WITH CHARGE RESTRICTIONS

TECHNICAL FIELD

The present disclosure relates generally to microgrids and, for example, to a microgrid controller configured to control or manage an operation of a microgrid.

BACKGROUND

A microgrid is a self-sufficient energy system that serves a particular geographic area, such as a college campus, a hospital complex, a business center, a neighborhood, a mining site, a drilling site, and/or the like. Within a microgrid are one or more kinds of distributed energy resources (DERs) (e.g., solar panels, wind turbines, fuel cells, photovoltaic (PV) cells, generators, energy storage devices (e.g., batteries, capacitors), and/or other energy sources) that produce power for the microgrid. Some microgrids are configured as off-grid electrical power distribution systems (e.g., stand-alone microgrids or islands) that do not connect to a larger electrical power distribution system (e.g., a macrogrid) run by, for example, an electric utility or power plant. Some microgrids are able to operate in a grid-connected mode and in a stand-alone mode. In a grid-connected mode, a microgrid may operate connected to and synchronous with the larger electrical power distribution system. In a stand-alone mode, the microgrid may be disconnected from the larger electrical power distribution system and operate as a stand-alone microgrid. A microgrid controller may control whether the microgrid operates in the grid-connected mode or in the stand-alone mode, for example, based on a schedule or based on one or more conditions being satisfied.

A microgrid may have a number of different types of energy resource systems that supply power to the microgrid to operate one or more loads, including energy storage type systems (e.g., energy storage system (ESS) assets) and non-energy-storage type systems (e.g., non-ESS assets). In current microgrids, charging or discharging of ESS assets using multiple non-ESS assets with charge restrictions is complex and has not been addressed by available microgrid controllers. A charge restriction may be placed on a non-ESS asset when the non-ESS asset is not permitted to charge a particular ESS asset or a group of ESS assets. Moreover, each non-ESS asset may have a different set of charge restrictions, such that the charge restriction may be linked to a different ESS asset or a different group of ESS assets. Thus, charge restrictions may increase a complexity of dispatching non-ESS assets for charging ESS assets. In addition, some non-ESS assets may have no charge restrictions.

Dispatch complexity of the non-ESS assets and ESS assets may arise due to many different applications of microgrids. In addition, ESS assets may be charged from all non-ESS assets, from a few non-ESS assets based on charge restrictions, or from none of the non-ESS assets based on charge restrictions. Additionally, some non-ESS assets may have configurable limits based on charge restrictions. Thus, ESS assets may be charged from all non-ESS assets with or without configurable limits, some non-ESS assets with one or more configurable limits, none of the non-ESS assets, and/or a hybrid combination with one or more restrictions placed on one or more assets.

China Patent Publication CN117439058A discloses a micro-grid dispatching method based on distributed robust optimization (DRO). As detailed in CN117439058A, the method comprises the steps: applying a DRO method based on multiple discrete scenes to a micro-grid system which comprises natural gas pressure energy power generation equipment and a centralized charging station. CN117439058A further explains that the minimum operation cost of a micro-grid system and the minimum power fluctuation of a connecting line are jointly used as scheduling optimization targets. Additionally, CN117439058A considers uncertainty of natural gas pressure energy power generation, photovoltaic power generation and loads, leading to the establishment of a two-stage DRO model based on a DRO method of multiple discrete scenes. CN117439058A also indicates that when the micro-grid system executes the scheduling plan, the overall operation cost of the micro-grid system can be effectively reduced, the power fluctuation of the tie line can be inhibited, and the robustness is high. Finally, CN117439058A mentions, when the first objective function is constructed, the situations of natural gas pressure energy abandoning and photovoltaic power generation abandoning are fully considered, and it is guaranteed that the dispatching effect of the micro-grid system is optimal. However, CN117439058A does not provide a dispatch strategy for dispatching non-ESS assets with charge restrictions and/or configurable limits for charging ESS assets.

The microgrid controller of the present disclosure solves one or more of the problems set forth above and/or other problems in the art.

SUMMARY

In some implementations, a microgrid controller of a microgrid includes a communication interface configured to receive load information corresponding to a plurality of loads connected to the microgrid, receive energy resource information corresponding to a plurality of energy resource systems connected to the microgrid, and output control signals for controlling an operation of each energy resource system of the plurality of energy resource systems, wherein the plurality of energy resource systems includes one or more energy storage systems (ESSs) configured to be charged and discharged, and one or more non-ESSs configured to generate power to be supplied to the microgrid; one or more memories configured to store a plurality of state-of-charge (SOC) setpoints corresponding to the one or more ESSs, a lower dispatch threshold that varies based on the plurality of SOC setpoints, and an upper dispatch threshold that varies based on the plurality of SOC setpoints; and one or more processors, coupled to the one or more memories, configured to: calculate a total load allocated to the plurality of energy resource systems based on the load information, measure a current SOC of the one or more ESSs, determine an aggregate output power of the one or more non-ESSs based on a relationship of the total load relative to the lower dispatch threshold and the upper dispatch threshold for the current SOC, configure the one or more non-ESSs to provide the aggregate output power, and set the one or more ESSs into an operation state of a plurality of operation states based on the relationship of the total load relative to the lower dispatch threshold and the upper dispatch threshold for the current SOC, wherein the plurality of operation states include a charging state and a discharging state.

In some implementations, a control method includes receiving, by a microgrid controller of a microgrid, load information corresponding to a current load demand of a plurality of loads connected to the microgrid; receiving, by the microgrid controller, energy resource information corresponding to a plurality of energy resource systems connected to the microgrid, wherein the plurality of energy resource systems includes one or more ESSs configured to be charged and discharged, and one or more non-ESSs configured to generate power to be supplied to the microgrid; and controlling, by the microgrid controller, the plurality of energy resource systems based on the load information, a plurality of state-of-charge (SOC) setpoints corresponding to the one or more ESSs, a lower dispatch threshold that varies based on the plurality of SOC setpoints, and an upper dispatch threshold that varies based on the plurality of SOC setpoints, wherein controlling the plurality of energy resource systems includes: calculating a total load allocated to the plurality of energy resource systems based on the load information; measuring a current SOC of the one or more ESSs; determining an aggregate output power of the one or more non-ESSs based on a relationship of the total load relative to the lower dispatch threshold and the upper dispatch threshold for the current SOC; configuring the one or more non-ESSs to provide the aggregate output power; and setting the one or more ESSs into an operation state of a plurality of operation states based on the relationship of the total load relative to the lower dispatch threshold and the upper dispatch threshold for the current SOC, wherein the plurality of operation states include a charging state and a discharging state.

DETAILED DESCRIPTION

Figure 1:
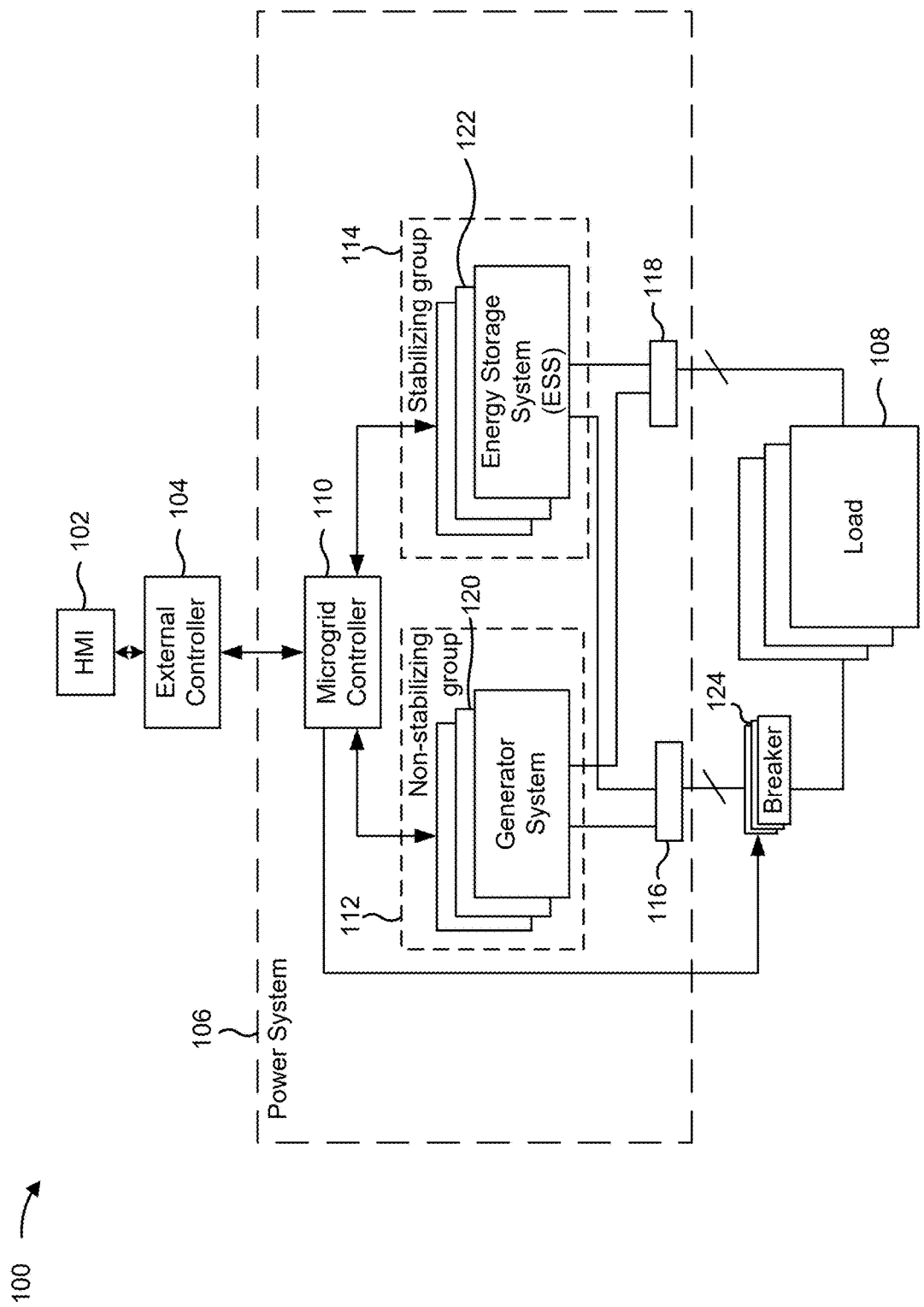
FIG. 1 shows a system according to one or more implementations.

This disclosure relates to a power distribution system, and is applicable to any system that distributes and/or receives power via a power grid. Some aspects relate to a microgrid controller that is configured to control one or more components and/or systems associated with the microgrid, including energy resource systems and/or loads. The microgrid controller may control a state of the microgrid based on one or more conditions being satisfied.

A dispatch strategy for charging, slow charging, discharging, slow discharging, and idling of ESS assets is provided by considering individual charging restrictions of non-ESS assets in the microgrid. Typically, a microgrid includes two types of assets. One type of asset includes non-energy-storage systems (non-ESSs), such as intermittents, gensets, utilities, fuel cells, wind turbines, and PV cells. Another type of asset includes energy storage systems (ESSs), such as batteries, capacitors, and fly wheels. ESS assets are bidirectional so they can be charged, discharged, and/or idled based on various parameters, such as current state-of-charge (SOC), load, and available power of the non-ESS assets. ESS assets can be grouped together based on type, operating characteristics, or user defined configuration to form a group. Each Group of ESS can have multiple individual ESS assets. A single ESS asset can also form an ESS group.

A non-ESS asset having a charge restriction to a particular group of ESS assets is excluded from charging the particular group of ESS assets. Thus, when a charge restriction is enabled for a non-ESS asset, the microgrid controller may prohibit or otherwise restrict the non-ESS asset from charging the one or more ESS assets in the particular group of ESS assets. A charging restriction may link a non-ESS asset with a particular ESS asset or a particular group of ESS assets. Moreover, a non-ESS asset may have multiple charging restrictions, with each charging restriction linked to a different particular ESS asset or a different group of ESS assets.

The dispatch strategy, performed by the microgrid controller, may include obtaining aggregated dispatch configurations for all non-ESS and groups of ESS assets by an iterative interaction of non-ESS assets with groups of ESS assets, considered group by group. Distribution of an aggregated dispatch between various non-ESS and a group of ESS assets can be performed by different techniques such as rule-based or optimization-based conditional logic. Based on the dispatch strategy, a microgrid load may be distributed among non-ESS assets to obtain individual non-ESS asset dispatches. Additionally, the dispatch strategy may include determining an operation state of each ESS asset (or each group of ESS assets), including charging, slow charging, discharging, slow discharging, and idling of each ESS asset (or each group of ESS assets) by considering the microgrid load, an output power dispatched from the non-ESS assets to supply the microgrid load, an available output power of the non-ESS assets (if any) after microgrid load dispatch of the non-ESS assets, a current SOC of each ESS (or each group of ESS assets), and/or individual charging restrictions of the non-ESS assets. Thus, the dispatch strategy may include obtaining the aggregated dispatch for all non-ESS assets and a group of ESS assets and distributing the aggregated dispatch between the non-ESS assets and the one or more ESS assets in the group of ESS assets. The dispatch strategy may be performed iteratively for each group of ESS assets on a group-by-group basis.

In accordance with the dispatch strategy, the microgrid controller may distribute the microgrid load among the non-ESS assets to obtain individual non-ESS asset dispatches. After obtaining the individual non-ESS asset dispatches, the microgrid controller may use a microgrid load distribution chart, formulated based on various inputs, such as output power setpoints (e.g., kilowatt (kW) setpoints), SOC setpoints, charge restrictions, a lower dispatch threshold, an upper dispatch threshold, and/or the individual non-ESS asset dispatches. The microgrid load distribution chart may correspond to a particular group of ESS assets, with each group of ESS assets having its own corresponding microgrid load distribution chart. The microgrid controller may evaluate the microgrid load distribution chart to determine the aggregated dispatch for non-ESS assets and a group of ESS assets.

FIG. 1 shows a system 100 according to one or more implementations. The system 100 may include a human-machine interface (HMI) 102, an external controller 104, a power system 106, and one or more loads 108.

The power system 106 may be a microgrid or other type of electrical power distribution system that may provide power to the one or more loads 108. In some cases, the power system 106 may be an off-grid electrical power distribution system. In some cases, the power system 106 may be configurable to operate in a grid-connected mode and in a stand-alone mode. The power system 106 may include a microgrid controller 110, a non-stabilizing group of energy resource systems 112 (e.g., a non-stabilizing group of DERs), a stabilizing group of energy resource systems 114 (e.g., a stabilizing group of DERs), and interfaces 116 and 118. Generally, "off-grid" may mean that the electrical power distribution system is not connected to a larger electrical power distribution system run by, for example, an electric utility or other large-scale electric power generation plant that serves electricity to a geographic area, campus, compound, etc. However, techniques disclosed herein may still be applied to electrical power distribution systems that are connected to larger electrical power distribution systems. For instance, the larger electrical power distribution systems may operate as a power source in a primary provider role or secondary provider role, while the power system 106 may operate as a power source in the other of the primary provider role or secondary provider role.

The non-stabilizing group of energy resource systems 112 may include one or more energy generator systems 120. Each energy generator system 120 may include a power generator (e.g., an engine-generator, a fuel cell, a PV cell, or other power generating system) and a local generator controller communicatively coupled to the microgrid controller 110. Thus, each energy generator system 120 may generate power from a respective power source. Each local generator controller may control how much power a respective power generator generates, control a rate of power distribution, and/or obtain status information corresponding to the respective power generator. Each local generator controller may be controlled by the microgrid controller 110. The non-stabilizing group of energy resource systems 112 may be referred to non-ESSs, non-ESS DERs, or non-ESS assets. A non-ESS may be a unidirectional non-ESS that can only supply (e.g., output) power, or may be a bidirectional non-ESS that can both supply power and absorb power. For example, an engine-generator (e.g., a generator set) may only be capable of supplying power to the power system 106, which may be provided to one or more loads 108 and/or one or more ESSs. Thus, engine-generators may be unidirectional non-ESSs. On the other hand, a fuel cell and a PV cell may be capable of supplying power to the power system 106, which may be provided to one or more loads 108 and/or one or more ESSs, and may be capable of absorbing power from the power system 106. Thus, fuel cells and PV cells may be bidirectional non-ESSs.

The stabilizing group of energy resource systems 114 may include one or more energy storage systems (ESSs) 122. Each energy storage system 122 may include an electric storage device (e.g., one or more batteries and/or capacitors) and a local ESS controller communicatively coupled to the microgrid controller 110. The stabilizing group of energy resource systems 114 may be referred to as ESSs, ESS DERs, or ESS assets. The stabilizing group of energy resource systems 114 may include different types of ESSs with different properties. For example, different types of batteries having different storage capacities, different output power, different charge rates, and different discharge rates may be provided. Each local ESS controller may control a flow of power into or out of a respective electric storage device, including charging of the respective electric storage device and discharging of the respective electric storage device, control a rate of power flow, and/or obtain status information corresponding to the respective electric storage device, such as state-of-charge (SOC), state-of-health (SOH), discharge limit, and other device parameters. Each local ESS controller may be controlled by the microgrid controller 110.

The system 100 may also include one or more breakers 124 (e.g., distribution breakers or switches) that may be individually controlled by the microgrid controller 110 to connect a respective load 108 to the power system 106 or disconnect the respective load 108 from the power system 106. The one or more breakers 124 may be part of one or both interfaces 116 and 118.

The HMI 102 may include one or more processors, and may be configured to receive and process one or more inputs from a user, such as an operator. Additionally, the HMI 102 may be configured to provide one or more prompts or outputs to the user. Thus, the HMI 102 may be a user terminal configured to interact with a user to process information and/or commands provided by the user, provide information to the user (e.g., status information), and/or perform one or more tasks or functions in response to processing the information and/or commands provided by the user. The HMI 102 may be communicatively coupled to the external controller 104, which may be communicatively coupled to the microgrid controller 110. In some implementations, the HMI 102 may be communicatively coupled directly to the microgrid controller 110. The external controller 104 may send commands to and receive information from the microgrid controller 110. For example, the external controller 104 may send commands to the microgrid controller 110 based on information received from the HMI 102. Thus, the external controller 104 may be a user-commanded controller. The external controller 104 may be integrated with the HMI 102. The external controller 104 may be a controller of a larger electrical power distribution system (e.g., a macrogrid, a power generation plant, and/or electric utility provider).

The power system 106 may provide electrical power to the one or more loads 108. Generally, the power system 106 may provide alternating current (AC) power at a particular voltage and a particular current. The microgrid controller 110 may control one or more energy storage systems 122 to instantaneously inject power when power is needed by the power system 106 or instantaneously absorb surplus power generated by the power system 106. Accordingly, one of more electric storage devices of the energy storage systems 122 may act as a power consumer on one or more energy generator systems 120 or as a power source for the one or more energy generator systems 120, to thereby ensure that system bus frequencies of the non-stabilizing group of energy resource systems 112 are maintained at a nominal value. In other words, the microgrid controller 110 may control the stabilizing group of energy resource systems 114 to stabilize loads of the non-stabilizing group of energy resource systems 112 in order to maintain the non-stabilizing group of energy resource systems 112 at a relatively constant load, which may reduce a recurrence of frequency deviations from the nominal value.

The microgrid controller 110 may be integrated with, or separate from (but connected to), the interfaces 116 and 118, the energy generator systems 120, and the energy storage systems 122, or combinations thereof. In this manner, a user may, through interaction with the HMI 102, add or remove energy generator systems 120 to increase/reduce system power generation and/or add or remove energy storage systems 122 to increase/reduce system energy storage capacity, in accordance with a user's preference. For instance, a user may prefer to add additional energy generator systems 120 and/or add additional energy storage systems 122 to increase load capacity if additional loads 108 are expected to be connected to the power system 106, or remove energy generator systems 120 and/or remove energy storage systems 122 to decrease load capacity if loads 108 are expected to be disconnected from the power system 106. Additionally, the microgrid controller 110 may be configured to add or remove energy generator systems 120 and/or add or remove energy storage systems 122 from the power system 106 based one or more conditions being satisfied. In some cases, the microgrid controller 110 may be configured to add or remove energy generator systems 120 and/or add or remove energy storage systems 122 from the power system 106 based on a schedule.

The one or more loads 108 may be any device that can connect to a power distribution system, such as the power system 106, to receive electrical power. Examples of loads may include heavy machinery (e.g., electric mining machines, haulers, etc.), personal devices, appliances, heating, ventilation, and air conditioning (HVAC) systems, industrial drills, personal residence electrical distribution systems, etc. The loads 108 may include one or more non-stable loads, such as one or more cyclic loads. The loads 108 may include unidirectional loads (e.g., loads that can only receive power from the power system 106), bi-directional loads (e.g., loads that can both receive power from the power system 106 and provide power to the power system 106), charging loads (e.g., loads that include a chargeable electric battery), essential loads (e.g., loads that require uninterrupted service), and/or non-essential loads (e.g., loads that do not require uninterrupted service). Loads may be assigned different priorities based on load type, load classification, and/or operation state or mode.

Generally, the one or more loads 108 may receive the power from the power system 106 and use the power in accordance with the operations of the one or more loads 108. Users of the power system 106 and the one or more loads 108 may connect/disconnect the one or more loads 108 by electrically connecting the one or more loads 108 to the interfaces 116 and 118 of the power system 106. For instance, the interfaces 116 and 118 may have AC plugs/sockets to connect the one or more loads 108 in parallel to the one or more energy generator systems 120 and the one or more energy storage systems 122 of the power system 106. One or more loads 108 may include a local load controller that may collect load information and transmit the load information to the microgrid controller 110. Load information may include information indicating a load type, a load classification, and/or an operation state or mode of a load 108. The loads can be active (real) or reactive to allow for a power quality-based approach to scheduling. Load information may include load data of a load, such as maximum load and minimum load. For chargeable loads, load information may include maximum charging load, maximum state of charge, minimum state of charge, current state of charge, and usable discharge energy as a function of the current state of charge. Load information may be received by the microgrid controller 110 via the interfaces 116 and 118, which may include one or more communication interfaces coupled to the microgrid controller 110.

The interfaces 116 and 118 may also have a plurality of generator connections and a plurality of energy store connections. The plurality of generator connections may be hardwired electrical connections and/or AC plugs/sockets to connect the one or more energy generator systems 120 in parallel to the at least one load 108 and the one or more energy storage systems 122. The plurality of energy store connections may be hardwired electrical connections and/or AC plugs/sockets to connect the one or more energy storage systems 122 in parallel to the one or more loads 108 and the one or more energy generator systems 120. For instance, the power system 106 may or may not allow addition/removal of energy generator systems 120 and/or addition/removal of energy storage systems 122. Therefore, depending on a configuration, the interfaces 116 and 118 may include: (1) hardwired electrical connections that connect the at least one energy generator system 120; (2) AC plugs/sockets to connect/disconnect the at least one energy generator system 120; (3) hardwired electrical connections that connect the at least one energy storage system 122; and/or (4) AC plugs/sockets to connect/disconnect the at least one energy storage system 122. The interfaces 116 and 118 may be coupled to a system bus (e.g., a power bus) of the power system 106. The system bus may enable one of more of the energy storage systems 122 to absorb power from one or more energy generator systems 120 and/or one or more loads 108 (e.g., for charging and/or storing power).

The one or more energy generator systems 120 may also include communication interfaces. The communication interfaces of the one or more energy generator systems 120 may enable the one or more energy generator systems 120 to communicate with the microgrid controller 110. For instance, the one or more energy generator systems 120 may be connected to the microgrid controller 110 by wired or wireless communication. The one or more energy generator systems 120 may provide the microgrid controller 110 with generator data (e.g., energy resource information). The generator data, for each of the one or more energy generator systems 120, may include load data and/or generator parameters. The load data may include a current (e.g., instantaneous) load seen by the one or more energy generator systems 120 and/or past load data (if one or more energy generator systems 120 store such data locally). The current load/past load data may include voltage (e.g., in volts) and/or current (e.g., in amperes) measured by one or more sensor components included in an energy generator system 120. The generator parameters may include a generator set maximum threshold value and a generator set minimum threshold value. Alternatively, to reduce transmission bandwidth, the generator data may omit the generator parameters, and the one or more energy generator systems 120 may transmit the generator parameters during an initial configuration process between the one or more energy generator systems 120 and the microgrid controller 110. The generator set maximum threshold value and the generator set minimum threshold value may indicate a maximum power load and a minimum power load, respectively, that a generator of an energy generator system 120 may support.

The one or more energy storage systems 122 may be any energy storage device that can store and output AC power. For instance, the one or more energy storage systems 122 may include at least one electrical-chemical energy storage (e.g., a battery), electrical energy storage (e.g., a capacitor, a supercapacitor, or a superconducting magnetic energy storage), mechanical energy storage (e.g., a fly wheel, a pump system), and/or any combination thereof. The one or more energy storage systems 122 may include inverters (individually or collectively) so that the one or more energy storage systems 122 may operate as a power consumer or a power source. The one or more energy storage systems 122 may also include electronic control mechanisms to control (1) how much load the one or more energy storage systems 122 draw, or (2) how much AC power the one or more energy storage systems 122 output.

The one or more energy storage systems 122 may also include communication interfaces. The communication interfaces of the one or more energy generator systems 120 may enable the one or more energy storage systems 122 to communicate with the microgrid controller 110. For instance, the one or more energy storage systems 122 may be connected to the microgrid controller 110 by wired or wireless communication. The one or more energy storage systems 122 may provide the microgrid controller 110 with energy storage data (e.g., energy resource information) and may receive instructions from the microgrid controller 110.

The energy storage data may include, for each of the at least one energy store, a current energy level (e.g., kilowatt-hours currently stored), total energy storage capacity (e.g., kilowatt-hours of capacity), and/or discharge/charge parameters. The current energy level may be measured by a battery meter of an energy storage. The battery meter may one or combinations of a voltmeter, an amp-hour meter, and/or an impedance-based meter. The discharge/charge parameters may indicate an amount of discharge power and an amount of charge power for a respective energy storage device of the one or more energy storage systems 122. Alternatively, to reduce transmission bandwidth, the energy storage data may omit the discharge/charge parameters, and the one or more energy storage systems 122 may transmit the discharge/charge parameters when the one or more energy storage systems 122 are first connected to the microgrid controller 110.

The one or more energy storage systems 122 may receive requests (e.g., instructions) for the energy storage data to provide the energy storage data and/or continuously provide the energy storage data to the microgrid controller 110. The instructions may include energy storage dispatch (ESD) instructions. An ESD instruction may include an instruction to inject power to a system bus of the power system 106 or absorb power from the system bus of the power system 106. ESD instructions may be provided in control signals (e.g., communication signals that provide the ESD instructions). At least one ESD instruction may be utilized to rapidly stabilize the load, thereby stabilizing the bus frequency of the power system 106 in a time efficient manner, rather than attempting to stabilize the load using the one or more energy generator systems 120 alone. The one or more energy storage systems 122 may control the inverters and the electronic control mechanisms to control (1) quantity of load drawn by the one or more energy storage systems 122, or (2) the amount of AC power output produced by the one or more energy storage systems 122, in accordance with the ESD instructions. Reactive and/or active may be used as a qualifier for loads, where reactive loads may contribute to a stabilization algorithm in addition to the active or real loads.

The microgrid controller 110 may include at least one memory device (e.g., one or more memories) for storing instructions (e.g., program code); at least one processor for executing the instructions from the memory device to perform a set of desired operations; and a communication interface (e.g., coupled to a communication bus) for facilitating the communication between various system components. The instructions may be computer-readable instructions for executing a control application. The communication interface of the microgrid controller 110 may enable the microgrid controller 110 to communicate with the one or more energy generator systems 120 and the one or more energy storage systems 122. The microgrid controller 110, while executing the control application, may receive the generator data and the energy storage data (e.g., energy resource information), process the generator data and the energy storage data to generate one or more ESD instructions, and output the ESD instructions to one or more energy generator systems 120 and/or to one or more energy storage systems 122.

To process the generator data and the energy storage data to generate the ESD instructions, the control application may include a load stabilization function and/or an SOC function. The control application may also include a generator set limit function and/or energy store discharge/charge limit function to generate the ESD instruction. In some cases, the load stabilization function may be activated while the power system 106 is configured in stand-alone mode in order to provide off-grid load stabilization. The microgrid controller 110 may automatically activate or deactivate the aforementioned system functions based on presence or absence of systems parameters (such as no generator set minimum threshold value is available, etc.) or one or more system conditions being satisfied.

The microgrid controller 110 may execute a dispatch strategy (e.g., a dispatch strategy algorithm) by obtaining an aggregated dispatch for all energy generator systems 120 and all energy storage systems 122 (e.g., non-ESS assets and ESS assets) and distributing the aggregated dispatch between the energy generator systems 120 and the energy storage systems 122, as described herein. An aggregated dispatch may be obtained for each group of ESS assets. The microgrid controller 110 may execute the dispatch strategy for charging, slow charging, discharging, slow discharging, and idling of ESS assets in a group of ESS assets by considering individual charging restrictions of non-ESS assets in the microgrid. The microgrid controller 110 may use a microgrid load distribution chart, formulated based on various inputs, such as output power setpoints (e.g., kilowatt (kW) setpoints), SOC setpoints, individual charge restrictions, a lower dispatch threshold, an upper dispatch threshold, and/or the individual non-ESS asset dispatches. The microgrid load distribution chart may be stored in memory and may be adapted by the microgrid controller 110 based on charge restrictions placed on any of the non-ESS assets. The microgrid controller 110 may evaluate the microgrid load distribution chart to determine the aggregated dispatch for non-ESS assets and a group of ESS assets. Thus, the microgrid controller 110 may execute the dispatch strategy algorithm to determine the aggregated dispatch and to generate ESD instructions for the non-ESS assets and the group ESS assets based on the aggregated dispatch. Multiple microgrid load distribution charts may be stored in memory, with each microgrid load distribution chart corresponding to a respective group of ESS assets. Thus, the microgrid controller 110 may evaluate a respective microgrid load distribution chart to determine the aggregated dispatch for the non-ESS assets and a corresponding group of ESS assets. In this way, the microgrid controller 110 may determine a respective aggregated dispatch for the non-ESS assets for each group of ESS assets.

Generally, the load stabilization function may ensure that system bus frequencies of the one or more energy generator systems 120 are maintained at a nominal value by causing an amount of power to be absorbed/injected by the one or more energy storage systems 122. The amount of power may be determined based on a difference from an instantaneous load and a moving average of the load. Meanwhile, the SOC function may ensure that the one or more energy storage systems 122 are charged to a target SOC or a target SOC range such that a SOC of one or more energy storage systems does not drift too low or too high, outside of a desired operating range (e.g., the target SOC range). The target SOC or the target SOC range may enable the at least one energy storage system 122 to provide long term beneficial use to the system 100, such as having a range of operation usable by the power system 106 and/or avoid degradation ranges of the one or more energy storage systems 122.

Furthermore, the systems and methods of the present disclosure may check the ESD instruction against acceptable generator maximum/minimum loads of the one or more energy generator systems 120 and the discharge/charge limits of the one or more energy storage systems 122, so as to safely operate the one or more energy generator systems 120.

The instructions may be provided according to a load stabilization algorithm that may be executed by the microgrid controller 110 to increase a microgrid power quality by reducing the recurrence of frequency deviations that are caused by repetitive load steps (e.g., caused by one or more cyclic loads). The communication interface of the microgrid controller 110 may receive load information corresponding to a current load demand of the loads 108 connected to the microgrid and output one or more control signals (e.g., ESD instructions) for controlling a plurality of energy resource systems associated with the microgrid. The plurality of energy resource systems may include the non-stabilizing group of energy resource systems 112 and the stabilizing group of energy resource systems 114.

One or more energy generator systems 120 may include an engine-generator that provides AC power to the power system 106, which may provide the AC power to the at least one load 108. Generally, an engine-generator may be any device that converts motive power (mechanical energy) into electrical power to output the AC power. An engine-generator may be a gas turbine electrical generator. In such gas turbine electrical generators, fast changes in load from the at least one load 108 may cause a system bus frequency to deviate from a nominal value. The system bus frequency may be a frequency of electrical components of the generator. For instance, such gas turbine electrical generators may have isochronous frequency control governors that may try to maintain the system bus frequency to the nominal value in response to changes of the load of the one or more loads 108. Therefore, during a transient load charge (e.g., a load transient), the system bus frequency may change as the load on the engine-generator changes. However, a rate of return of the system bus frequency back to the nominal value is slower than a desired rate due to an inertia of motion of physical components (e.g., a rotor of a stator-rotor) of the engine-generator. The slow rate of return may reduce power quality of the power system 106. The power quality of the power system 106 may be determined based on the voltage, frequency, and waveform of the power output to the one or more loads 108. A high power quality may ensure continuity of service for the one or more loads 108, such that the one or more loads 108 are able to properly function as intended. A low power quality may cause the one or more loads 108 to malfunction, fail prematurely, or not operate at all.

Therefore, avoiding load transients may be beneficial in providing better power quality. However, generally, controlling a load of the one or more loads 108 may not be possible or desirable. Instead, the microgrid controller 110 may control the one or more energy storage systems 122 of the stabilizing group of energy resource systems 114 to act as a power consumer or as an energy source, so that the one or more energy generator systems 120 of the non-stabilizing group of energy resource systems 112 may maintain the system bus frequency at the nominal value, thereby ensuring better power quality.

The microgrid controller 110 may control the one or more energy storage systems 122 to act as a near instantaneous load or energy source, so that the one or more energy generator systems 120 may maintain the system bus frequency at the nominal value, thereby ensuring better power quality. In one aspect of this disclosure, the microgrid controller 110 may control the one or more energy storage systems 122 to instantaneously inject power when power is needed by the at least one load 108 or instantaneously absorb surplus power generated by the one or more energy generator systems 120. Accordingly, the microgrid controller 110 regulates the power supply such that an exact amount of desired power supply flows in or out of the power system 106 at any given time. The instantaneous injecting/absorbing power may be performed to control the amount of transient load seen by the power system 106 and thus stabilize the load and resulting system bus frequency of the one or more energy generator systems 120. The desired power may be calculated by performing a moving average of a system load and then taking a difference of the moving average and an instantaneous load value. This difference may be the desired power output/absorbed of the energy store. Causing the one or more energy storage systems 122 to output/absorb the desired power (e.g., by transmitting the energy storage dispatch instructions) may limit the transient load seen by the one or more energy generator systems 120.

Figure 2:
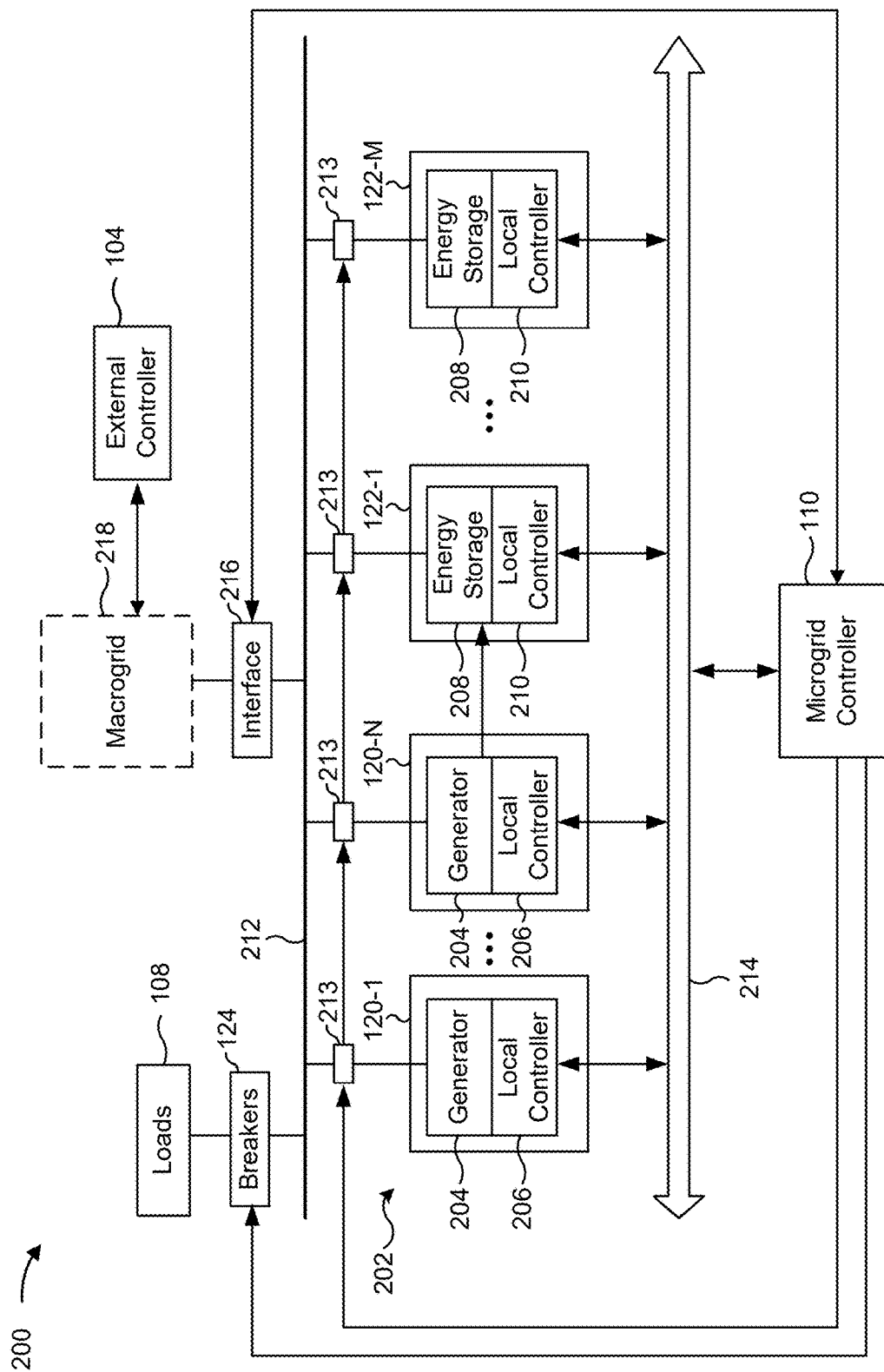
FIG. 2 shows a microgrid according to one or more implementations.

FIG. 2 shows a microgrid 200 according to one or more implementations. The microgrid 200 may be an example of the power system 106 described in connection with FIG. 1. The microgrid 200 may include a plurality of DERs 202. The plurality of DERs 202 may include N energy generator systems 120 and M energy storage systems 122, where N and M are integers greater than zero. For example, the plurality of DERs 202 may include a first energy generator system 120-1 and an $N^{th}$ energy generator system 120-N. Additionally, the plurality of DERs 202 may include a first energy storage system 122-1 and an $M^{th}$ energy storage system 122-M. Each energy generator system 120 may include a power generator 204 and a local generator controller 206. Each energy storage system 122 may include an electric storage device 208 (e.g., one or more batteries and/or capacitors) and a local ESS controller 210.

Each energy generator system 120 may be coupled to a power bus 212 for providing power to one or more loads connected to the power bus 212. Additionally, each energy storage system 122 may be coupled to the power bus 212 for providing power to or absorbing power from the power bus 212 (e.g., for providing power to or absorbing power from one or more components, such as one or more loads and/or one or more energy generator systems 120 connected to the power bus 212).

The microgrid 200 may also include the microgrid controller 110 that is communicatively coupled to the local controllers (e.g., local generator controllers 206 and local ESS controllers 210) of each DER 202 across a communication bus 214. The communication bus 214 may also enable the microgrid 200 to communicate with one or more loads and/or one or more load management systems (e.g., charging systems, fleet management systems, local load controllers, etc.). In some cases, two or more communication buses 214 may be provided. For example, one communication bus may be provided to communicate with local controllers and another communication bus may be provided to communicate with one or more loads and/or one or more load management systems.

Each local generator controller 206 may include any appropriate hardware, software, and/or firmware to sense and control a respective power generator 204, and send information to, and receive information, from microgrid controller 110. For example, a local generator controller 206 may be configured to sense, determine, and/or store generator data of its respective power generator 204. The generator data may be sensed, determined, and/or stored in any conventional manner. Each local generator controller 206 may control whether a respective power generator 204 is connected to or disconnected from the power bus 212 (for example, based on an instruction or a control signal received from the microgrid controller 110).

Each local ESS controller 210 may include any appropriate hardware, software, and/or firmware to sense and control a respective electric storage device 208, and send information to, and receive information, from microgrid controller 110. For example, a local ESS controller 210 may be configured to sense, determine, and/or store various characteristics of its respective electric storage device 208. Such characteristics of the respective electric storage device 208 may include, among others, a current SOC, a current energy, an SOC minimum threshold, an SOC maximum threshold, and a discharge limit of the respective electric storage device 208. These characteristics of each respective electric storage device 208 may be sensed, determined, and/or stored in any conventional manner. Each local ESS controller 210 may control whether a respective electric storage device 208 is connected to or disconnected from the power bus 212 (for example, based on an instruction or a control signal received from the microgrid controller 110).

The microgrid controller 110 may receive or determine a need for charging or discharging of power from the microgrid 200, and may be configured to determine and send signals to allocate a total charge request and/or total discharge request across all of the plurality of DERs 202.

When performing the power allocation functions, the microgrid controller 110 may allocate a certain amount of power from each energy generator system 120 to one or more loads 108. The one or more loads 108 may be connected to the power bus 212 via one or more breakers 124 to receive power from the power bus. When performing the power allocation functions, the microgrid controller 110 may allocate a total charge request and/or a total discharge request across the energy storage systems 122 as a function of a usable energy capacity of each energy storage system 122. The usable energy capacity corresponds to the capacity or amount of energy that an energy storage system 122 can receive in response to a total charging request (usable charge energy), or the capacity or amount of energy that an energy storage system can discharge in response to a total discharge request (usable discharge energy). The usable charge energy is a function of a maximum state of charge, current state of charge, and current energy of the energy storage system, and the usable discharge energy is a function of a minimum state of charge, and current energy of the energy storage system 122. The microgrid controller 110 may determine a usable charge/discharge capacity of each energy storage system 122 (e.g., SOC), a desired charge/discharge of each energy storage system 122, a remainder power of each energy storage system 122, and/or an SOH of each energy storage system 122.

Thus, the microgrid controller 110 regulates a power supply of the microgrid 200 such that an exact amount of desired power flows into or out of the power system 106 at any given time. The microgrid controller 110 may regulate the power supply of the microgrid 200 in cooperation with the local generator controllers 206 and the local ESS controllers 210. The microgrid controller 110 may transmit control signals (e.g., instructions) to the local generator controllers 206 and the local ESS controllers 210 to activate (e.g., to bring online), deactivate (to bring offline), or curtail (limit or regulate to a target output) one or more of the DERs 202. Additionally, or alternatively, the microgrid controller 110 may transmit control signals to one or more switches 213 to control a switch state (e.g., an on state or an off state) of the one or more switches 213, for example, to connect one or more DERs 202 to or disconnect one or more DERs 202 from the microgrid 200 (e.g., the power bus 212). The switches 213 may be integrated in one or both interfaces 116 and 118 described in connection with FIG. 1.

In some cases, two or more power buses 212 may be provided. For example, a power bus may be provided to couple one or more power generators 204 to one or more electric storage devices 208 for charging the one or more electric storage devices 208. For example, the microgrid controller 110 may selectively couple a power generator 204 to an electric storage device 208 to charge the electric storage device 208. Thus, the power bus 212 may be part of a power distribution network of the microgrid 200 that may include one or more power buses used to distribute power between loads 108 and/or DERs 202.

The microgrid 200 may include an interface 216 for connecting the microgrid 200 to and disconnecting the microgrid 200 from an electrical power distribution system 218, such as a macrogrid. The electrical power distribution system 218 may include the external controller 104 (e.g., a macrogrid controller), as described in connection with FIG. 1. The external controller 104 may be coupled to the interface 216 for transmitting control signals, such as instructions or requests, to the microgrid controller 110. The interface 216 may include one or more electrical connections used for connecting the microgrid 200 to the electrical power distribution system 218. The interface 216 may include one or more switches or breakers that are controlled by the microgrid controller 110 for connecting the microgrid 200 to and disconnecting the microgrid 200 from the electrical power distribution system 218. For example, the one or more switches or breakers of the interface 216 may connect the power bus 212 (or another system bus) to or disconnect the power bus 212 (or another system bus) from the electrical power distribution system 218. Thus, the microgrid controller 110 may configure the microgrid 200 to operate in a grid-connected mode by connecting the microgrid 200 to the electrical power distribution system 218 or in a stand-alone mode by disconnecting the microgrid 200 from the electrical power distribution system 218.

The microgrid controller 110 may include one or more memories that are configured to store a plurality of SOC setpoints corresponding to the one or more ESSs (e.g., a group of ESS assets), a lower dispatch threshold that varies based on the plurality of SOC setpoints, and an upper dispatch threshold that varies based on the plurality of SOC setpoints. Additionally, the one or more memories may store a plurality of aggregate output power setpoints corresponding to the one or more non-ESSs. The lower dispatch threshold may vary based on the aggregate output power setpoints, and the upper dispatch threshold may vary based on the aggregate output power setpoints. Each energy generator system 120 (e.g., each non-ESS) may be associated with a respective set of individual output power setpoints (e.g., individual kW setpoints) at which the generator system 120 may operate to supply power. In particular, an individual output power setpoint may correspond to an output power level of the generator system 120 during operation. The microgrid controller 110 may calculate the plurality of aggregate output power setpoints as a sum of each respective set of individual output power setpoints of the generator systems 120, including any individual output power setpoint adjusted to a charge restricted output power setpoint.

The microgrid controller 110 may adjust the plurality of aggregate output power setpoints based on a charge restriction enabled for a particular generator system 120. The charge restriction may prohibit the particular generator system 120 from charging at least one of the energy storage systems 122. As described above, a generator system 120 may be associated with individual output power setpoints used for calculating the plurality of aggregate output power setpoints. The microgrid controller 110 may maintain any individual output power setpoint of the generator system 120 that is less than or equal to a total load at preconfigured setpoint values. For example, if the total load is 500 kW and an individual output power setpoint of the generator system 120 is preconfigured to 200 kW, the individual output power setpoint may remain at the preconfigured setpoint value of 200 kW because 200 kW is less than or equal to the total load of 500 kW. The preconfigured 200 kW setpoint value may be used for calculating the aggregate output power setpoints.

Additionally, the microgrid controller 110 may adjust any individual output power setpoint of the generator system 120 that is greater than the total load to a reduced setpoint value that is equal to the total load in order to generate one or more charge restricted output power setpoints. For example, if the total load is 500 kW and an individual output power setpoint of the generator system 120 is preconfigured to 600 kW, the microgrid controller 110 may adjust (e.g., restrict or otherwise limit) the individual output power setpoint of the generator system 120 from 600 kW to 500 kW, which is the value of the total load. The adjusted individual output power setpoint becomes a charge restricted output power setpoint that is used for calculating the aggregate output power setpoints. In other words, instead of using the preconfigured setpoint value of 600 kW, the microgrid controller 110 may use the charge restricted output power setpoint of 500 kW for calculating the aggregate output power setpoints. Thus, the microgrid controller 110 may adjust the plurality of aggregate output power setpoints based on one or more charge restricted output power setpoints.

The microgrid controller 110 may store, in one or more memories, a load distribution chart that includes the plurality of aggregate output power setpoints, the plurality of SOC setpoints, the lower dispatch threshold, and the upper dispatch threshold. The load distribution chart may define one or more charge regions and one or more discharge regions based on the lower dispatch threshold and the upper dispatch threshold. In addition, the load distribution chart may define one or more slow charge regions, one or more idle regions, and one or more slow discharge regions. The microgrid controller 110 may evaluate the load distribution chart to determine an operation region in the load distribution chart that corresponds to the total load and a current SOC, and select the operation state that corresponds to the operation region. The one or more charge regions and the one or more discharge regions may be operation regions from which the operation region is selected. An example of the load distribution chart is shown in FIG. 3.

The energy storage systems 122 may be allocated to different groups. For example, the energy storage system 122 may include different types of ESSs with different properties. For example, different types of batteries having different storage capacities, different output power, different charge rates, and different discharge rates may be provided. A load distribution chart may be maintained for each group of ESSs. Thus, the microgrid controller 110 may perform separate aggregated dispatches for each group of ESSs. The following operations may be performed with respect to one of those ESS groups, and may be repeated for other ESS groups based on a respective load distribution chart configured for a particular ESS group.

For determining an aggregated dispatch, the microgrid controller 110 may calculate a total load of the microgrid 200 or a total load allocated to the plurality of DERs 202 based on the load information received from the loads 108 or sensed by one or more sensors of the microgrid 200. The total load may be an aggregate kilowatt value of the loads 108. In addition, the microgrid controller 110 may measure a current SOC of one or more energy storage systems 122. For example, the microgrid controller 110 may measure the current SOC for a particular type or group of ESSs, which may include one or more energy storage systems 122. The microgrid controller 110 may determine an aggregate output power (e.g., a kW output) of the generator systems 120 (e.g., the non-ESSs) based on a relationship of the total load relative to the lower dispatch threshold and the upper dispatch threshold for the current SOC. The microgrid controller 110 may configure the generator systems 120 to provide the aggregate output power. The microgrid controller 110 may set the one or more energy storage systems 122 into an operation state of a plurality of operation states based on the relationship of the total load relative to the lower dispatch threshold and the upper dispatch threshold for the current SOC. The plurality of operation states may include a charging state and a discharging state. In some implementations, the plurality of operation states may include a charging state, a slow charging state, an idle state, a discharging state, and a slow discharging state. Each operation state may correspond to one or more regions in the load distribution chart.

Figure 3:
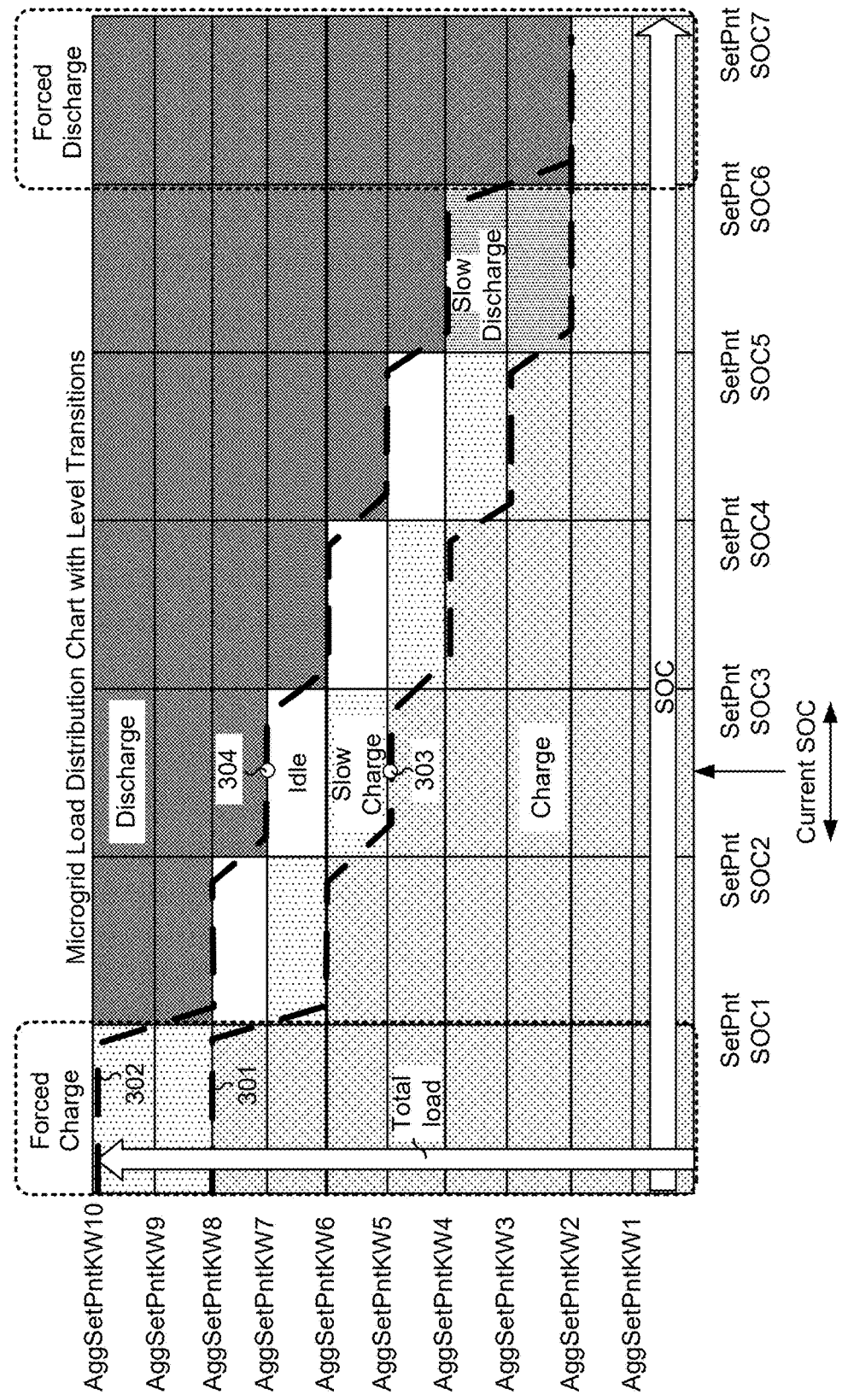
FIG. 3 shows a load distribution chart according to one or more implementations.

FIG. 3 shows a load distribution chart 300 according to one or more implementations. Non-ESS assets may have loading constraints, such as operating minimum, operating maximum, operating efficiency, and the like. Based on the application, a non-ESS asset may have additional constraints/setpoints (e.g., high efficiency and desirable setpoints). ESS assets (or an ESS group) may have SOC setpoints, such as minimum SOC, maximum SOC, target SOC, and the like. Based on the application, an ESS asset may have additional constraints/setpoints.

A non-ESS asset may have a charge restriction enabled for a particular ESS asset. For example, a binary value 0 may indicate that the non-ESS asset is allowed to charge the particular ESS asset (or ESS group), whereas a binary value 1 may indicate that the non-ESS asset is not allowed to charge the particular ESS asset (or ESS group). In other words, a binary value in a control table of a non-ESS asset may indicate whether a charge restriction for a particular ESS asset (or ESS group) is enabled or disabled.

The load distribution chart 300 includes a plurality of aggregate output power setpoints AggSetPntKW1, AggSetPntKW2, . . . , AggSetPntKW10, a plurality of SOC setpoints SetPntSOC1, SetPntSOC2, . . . , SetPntSOC10, a lower dispatch threshold 301, and an upper dispatch threshold 302. The lower dispatch threshold 301 may vary based on the plurality of SOC setpoints and the plurality of aggregate output power setpoints. The upper dispatch threshold 302 may also vary based on the plurality of SOC setpoints and the plurality of aggregate output power setpoints. The lower dispatch threshold 301 and the upper dispatch threshold 302 may be separated by a gap that may also vary based on the plurality of SOC setpoints and the plurality of aggregate output power setpoints.

The load distribution chart 300 may define one or more charge regions and one or more discharge regions based on the lower dispatch threshold 301 and the upper dispatch threshold 302. For example, regions below the lower dispatch threshold 301 may be charge regions, and regions above the upper dispatch threshold 302 may be discharge regions. Regions that are arranged in the gap between the lower dispatch threshold 301 and the upper dispatch threshold 302 may be slow charge regions, idle regions, or slow discharge regions, which may depend on the SOC setpoints and the aggregate output power setpoints.

By calculating the total load and measuring the current SOC of one or more energy storage systems 122 (e.g., a current SOC of a group of ESS assets), the microgrid controller 110 may use the total load and the current SOC as input parameters for determining an aggregated dispatch based on the load distribution chart 300. The microgrid controller 110 may determine where the current SOC falls within the load distribution chart 300 and corresponding threshold values for the lower dispatch threshold 301 and the upper dispatch threshold 302. For example, the current SOC may be between SOC setpoint SetPntSOC2 and SOC setpoint SetPntSOC3. The microgrid controller 110 may determine a first threshold value 303 of the lower dispatch threshold 301 that corresponds to the current SOC, and may determine a second threshold value 304 of the upper dispatch threshold 302 that corresponds to the current SOC. The microgrid controller 110 may compare the total load to at least one of the first threshold value or the second threshold value to determine the relationship of the total load relative to the lower dispatch threshold 301 and the upper dispatch threshold 302 for the current SOC. For example, the total load may be equal to, less than, or greater than the first threshold value 303, and/or the total load may be equal to, less than, or greater than the second threshold value 304.

The microgrid controller 110 may determine an aggregate output power (e.g., a kW output) of the generator systems 120 (e.g., the non-ESSs) based on a relationship of the total load relative to the lower dispatch threshold and the upper dispatch threshold for the current SOC. The microgrid controller 110 may configure the generator systems 120 to provide the aggregate output power to the microgrid 200 (e.g., to the loads 108). The microgrid controller 110 may set the one or more energy storage systems 122 into an operation state of the plurality of operation states based on the relationship of the total load relative to the lower dispatch threshold and the upper dispatch threshold for the current SOC. In some cases, the microgrid controller 110 may force the one or more energy storage systems 122 to charge if the current SOC corresponds to a first column of the load distribution chart 300. In some cases, the microgrid controller 110 may force the one or more energy storage systems 122 to discharge if the current SOC corresponds to a last column of the load distribution chart 300.

The current SOC and/or the total load may change during operation of the microgrid 200. As a result, the first threshold value 303 and the second threshold value 304 may change as the current SOC changes. In addition, the relationship of the total load relative to the lower dispatch threshold 301 and the upper dispatch threshold 302 for the current SOC may change as the total load changes. Thus, a region within the load distribution chart 300 that corresponds to the current SOC and the total load may also change as the current SOC and/or the total load changes.

Based on the total load being less than the lower dispatch threshold for the current SOC, the microgrid controller 110 may set the aggregate output power of the generator systems 120 to a threshold value (e.g., to the first threshold value 303) of the lower dispatch threshold 301 that corresponds to the current SOC. In addition, since the total load falls into a charging region of the load distribution chart 300 based on the current SOC (e.g., the total load being less than the first threshold value 303), the microgrid controller 110 may set the operation state of the one or more energy storage systems 122 to the charging state. Thus, the generator systems 120 may be dispatched to charge the one or more energy storage systems 122 (e.g., all ESS assets in a group of ESS assets will charge), with the dispatch being configured to take into account any charge restrictions placed on one or more of the generator systems 120. Thus, based on the total load being less than the lower dispatch threshold (e.g., the first threshold value 303) for the current SOC, the microgrid controller 110 may allocate a portion of the aggregate output power of the generator systems 120 for charging one or more energy storage systems 122 (e.g., for charging the group of ESS assets), where the portion of the aggregate output power is equal to the aggregate output power minus the total load.

Based on the total load being greater than the upper dispatch threshold for the current SOC, the microgrid controller 110 may set the aggregate output power of the generator systems 120 to a threshold value (e.g., to the second threshold value 304) of the upper dispatch threshold 302 that corresponds to the current SOC. In addition, since the total load falls into a discharging region of the load distribution chart 300 based on the current SOC (e.g., the total load being greater than the second threshold value 304), the microgrid controller 110 may set the operation state of the one or more energy storage systems 122 to the discharging state. Thus, the one or more energy storage systems 122 may be dispatched to discharge power to the microgrid 200 (e.g., to supply the total load). In other words, all ESS assets in a group of ESS assets will discharge. Based on the total load being greater than the upper dispatch threshold (e.g., the second threshold value 304) for the current SOC, the microgrid controller 110 may set an ESS output power of the one or more energy storage systems 122 to the total load minus the aggregate output power of the generator systems 120.

Based on the total load being between the lower dispatch threshold and the upper dispatch threshold for the current SOC (e.g., between the first threshold value 303 and the second threshold value 304), the microgrid controller 110 may set the operation state of the one or more energy storage systems 122 to a slow charging state, an idle state, or a slow discharging state based on the current SOC and the total load. In other words, all ESS assets in a group of ESS assets will be set into a same operation state. During the slow charging state, the one or more energy storage systems 122 may be charged at a reduced rate compared to a charging rate of the charging state. During the slow discharging state, the one or more energy storage systems 122 (e.g., the group of ESS assets) may be discharged at a reduced rate compared to a discharging rate of the discharging state. During the idle state, the one or more energy storage systems 122 may not be charging or discharging, or may be charged and discharged at equal rates.

Based on the operation state being set to the slow charging state, the microgrid controller 110 may set the aggregate output power of the generator systems 120 to a sum of a slow charge configured value and the total load, and may allocate the slow charge configured value for charging the one or more energy storage systems 122. Based on the operation state being set to the slow discharging state, the microgrid controller 110 may set the aggregate output power of the generator systems 120 to the total load minus a slow discharge configured value, and may set an ESS output power of the one or more energy storage systems 122 (e.g., the group of ESS assets) to the slow discharge configured value. Based on the operation state being set to the idle state, the microgrid controller 110 may set the aggregate output power of the generator systems 120 to the total load.

Figure 4:
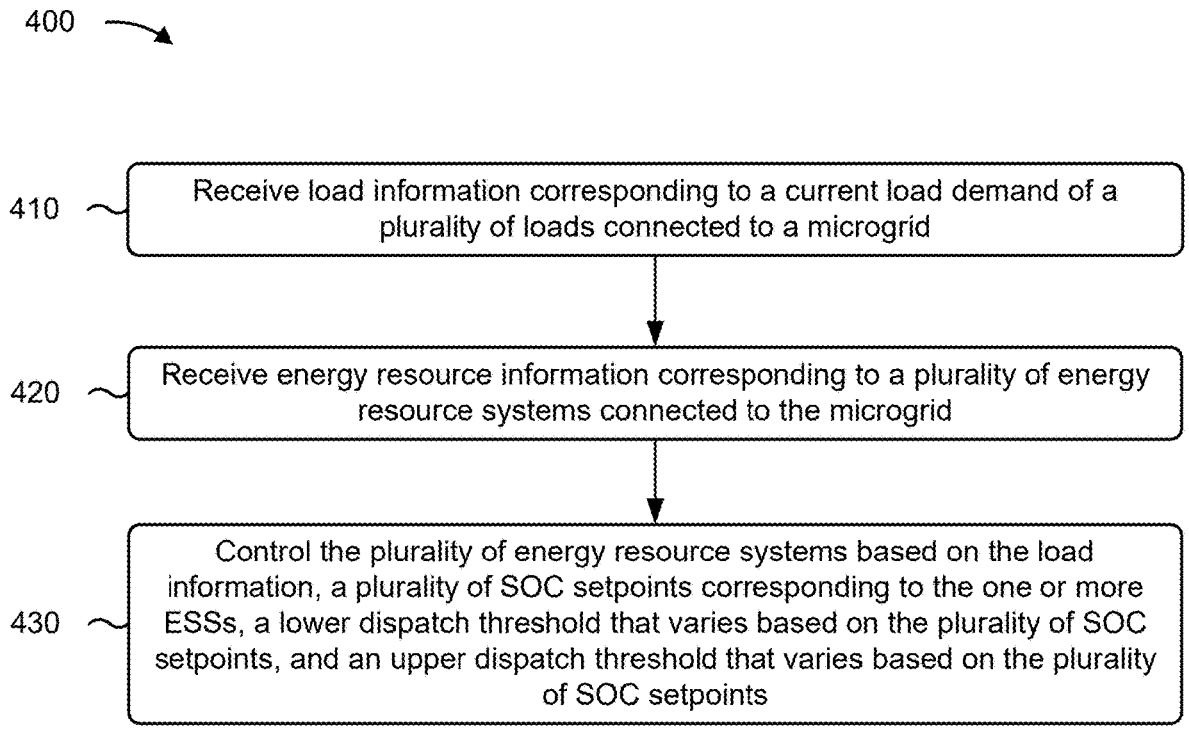
FIG. 4 is a flowchart of an example process associated with energy storage system dispatch strategy for multiple non-energy-storage systems with charge restrictions.

FIG. 4 is a flowchart of an example process 400 associated with energy storage system dispatch strategy for multiple non-energy storage systems with charge restrictions. One or more process blocks of FIG. 4 may be performed by a microgrid controller (e.g., microgrid controller 110). Additionally, or alternatively, one or more process blocks of FIG. 4 may be performed by another device or a group of devices separate from or including the microgrid controller, such as another device or component that is internal or external to the microgrid controller 110. For example, an HMI (e.g., HMI 102) may be configured to provide one or more parameters to the microgrid controller 110. For example, the HMI 102 may provide individual output power setpoints, aggregate output power setpoints, SOC setpoints, a lower dispatch threshold that varies based on the SOC setpoints and/or the aggregate output power setpoints, an upper dispatch threshold that varies based on the SOC setpoints and/or the aggregate output power setpoints, charge restrictions for one or more non-ESS assets, and/or a load distribution chart to the microgrid controller 110.

As shown in FIG. 4, process 400 may include receiving load information corresponding to a current load demand of a plurality of loads connected to the microgrid (410). For example, the microgrid controller 110 may receive load information corresponding to a current load demand of a plurality of loads connected to the microgrid, as described above.

As further shown in FIG. 4, process 400 may include receiving energy resource information corresponding to a plurality of energy resource systems connected to the microgrid (420). The plurality of energy resource systems may include one or more ESSs (e.g., a group of ESS assets) configured to be charged and discharged, and one or more non-ESSs configured to generate power to be supplied to the microgrid. For example, the microgrid controller 110 may receive energy resource information corresponding to a plurality of energy resource systems connected to the microgrid, as described above.

As further shown in FIG. 4, process 400 may include controlling the plurality of energy resource systems based on the load information, the plurality of SOC setpoints corresponding to the one or more ESSs, the lower dispatch threshold that varies based on the plurality of SOC setpoints, and the upper dispatch threshold that varies based on the plurality of SOC setpoints (430). For example, the microgrid controller 110 may control the plurality of energy resource systems, as described above. For example, controlling the plurality of energy resource systems may include calculating a total load allocated to the plurality of energy resource systems based on the load information; measuring a current SOC of the one or more ESSs; determining an aggregate output power of the one or more non-ESSs based on a relationship of the total load relative to the lower dispatch threshold and the upper dispatch threshold for the current SOC; configuring the one or more non-ESSs to provide the aggregate output power; and setting the one or more ESSs into an operation state of a plurality of operation states based on the relationship of the total load relative to the lower dispatch threshold and the upper dispatch threshold for the current SOC. The plurality of operation states may include a charging state and a discharging state, as well as other operation states.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
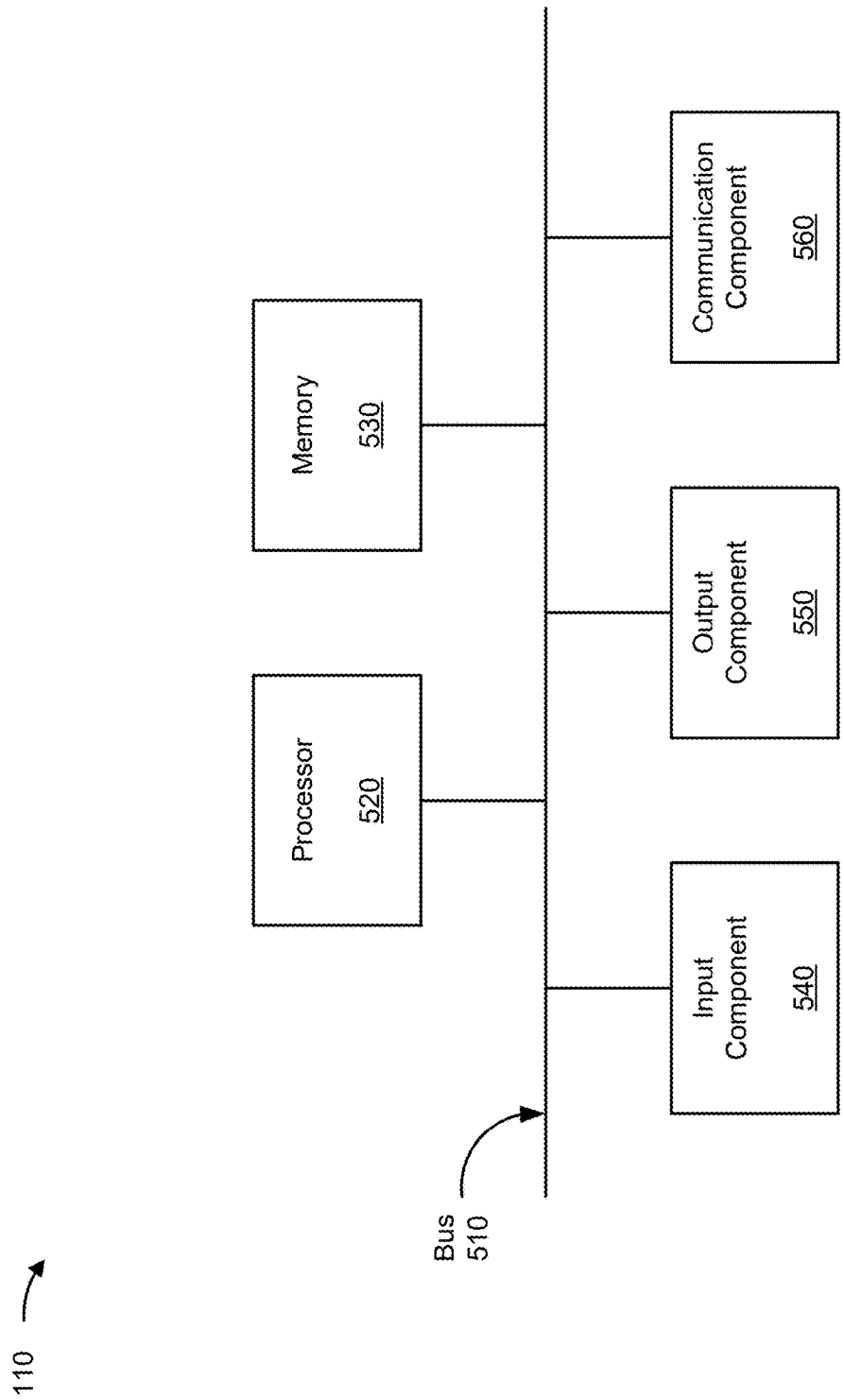
FIG. 5 is a diagram of example components of the microgrid controller associated with generating and executing a dispatch strategy.

FIG. 5 is a diagram of example components of the microgrid controller 110 associated with generating and executing a dispatch strategy. The microgrid controller 110 may include a bus 510, a processor 520, a memory 530, an input component 540, an output component 550, and/or a communication component 560.

The bus 510 may include one or more components that enable wired and/or wireless communication among the components of the microgrid controller 110. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus.

The processor 520 may include a central processing unit a microprocessor, a controller, a microcontroller, a digital signal processor, a field-programmable gate array, an application-specific integrated circuit, and/or another type of processing component. The processor 520 may be implemented in hardware, firmware, or a combination of hardware and software. The processor 520 may include one or more processors capable of being programmed to perform one or more operations or processes described elsewhere herein.

The memory 530 may store information, one or more instructions, and/or software (e.g., one or more software applications) related to the operation of the microgrid controller 110. The memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the microgrid controller 110 to receive input, load information, generator data, energy storage data, status information, scheduling information, and/or control signals (e.g., control signals from a macrogrid controller). The output component 550 may enable the microgrid controller 110 to provide output, such as one or more control signals for controlling loads, energy storage systems, breakers, switches, and other components associated with the microgrid described herein. The communication component 560 may enable the microgrid controller 110 to communicate with other devices via a wired connection and/or a wireless connection. For example, the communication component 560 may include a receiver, a transmitter, and/or a transceiver.

The microgrid controller 110 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. Execution of the set of instructions, by one or more processors 520, may cause the one or more processors 520 and/or the microgrid controller 110 to perform one or more operations or processes described herein. Hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

INDUSTRIAL APPLICABILITY

A dispatch strategy described herein may enable charging, slow-charging, discharging, slow-discharging, and idling of multiple microgrid ESS assets by considering individual charging restrictions of non-ESS microgrid assets, a total load, and a current SOC of one or more ESS assets. Moreover, the dispatch strategy may enable an aggregate output power provided by non-ESS assets to be determined based on the individual charging restrictions of non-ESS microgrid assets, the total load, and the current SOC of one or more ESS assets. A charge quantity or a discharge quantity of the ESS assets may also be determined based on the individual charging restrictions of non-ESS microgrid assets, the total load, and the current SOC of one or more ESS assets. A charging rate or a discharging rate may also be determined based on the individual charging restrictions of non-ESS microgrid assets, the total load, and the current SOC of one or more ESS assets. For example, operation states, the aggregate output power, the charge/discharge quantity, and the charging/discharging rate may be determined based on a load distribution chart. Thus, a distribution of an aggregated dispatch between various non-ESS assets and ESS assets may be optimized based on the dispatch strategy (e.g., based on a dispatch strategy algorithm) that takes into account individual charging restrictions placed on non-ESS microgrid assets. Multiple setpoints may be configured by a user to tune how aggressively ESS assets are charged and discharged to take into account different applications.

What is claimed is:

1. A microgrid controller of a microgrid, comprising:
a communication interface configured to receive load information corresponding to a plurality of loads connected to the microgrid, receive energy resource information corresponding to a plurality of energy resource systems connected to the microgrid, and output control signals for controlling an operation of each energy resource system of the plurality of energy resource systems, wherein the plurality of energy resource systems includes one or more energy storage systems (ESSs) configured to be charged and discharged, and one or more non-ESSs configured to generate power to be supplied to the microgrid;
one or more memories configured to store a plurality of state-of-charge (SOC) setpoints corresponding to the one or more ESSs, a lower dispatch threshold that varies based on the plurality of SOC setpoints, and an upper dispatch threshold that varies based on the plurality of SOC setpoints; and
one or more processors, coupled to the one or more memories, configured to:
calculate a total load allocated to the plurality of energy resource systems based on the load information,
measure a current SOC of the one or more ESSs,
determine an aggregate output power of the one or more non-ESSs based on a relationship of the total load relative to the lower dispatch threshold and the upper dispatch threshold for the current SOC,
configure the one or more non-ESSs to provide the aggregate output power, and
set the one or more ESSs into an operation state of a plurality of operation states based on the relationship of the total load relative to the lower dispatch threshold and the upper dispatch threshold for the current SOC,
wherein the plurality of operation states include a charging state and a discharging state.

2. The microgrid controller of claim 1, wherein the plurality of operation states include an idle state.

3. The microgrid controller of claim 1, wherein the one or more ESSs include a plurality of ESSs, and
wherein the one or more non-ESSs include a plurality of non-ESSs.

4. The microgrid controller of claim 1, wherein the one or more memories are configured to store a plurality of aggregate output power setpoints corresponding to the one or more non-ESSs, and
wherein the lower dispatch threshold varies based on the aggregate output power setpoints, and the upper dispatch threshold varies based on the aggregate output power setpoints.

5. The microgrid controller of claim 4, wherein the one or more processors are configured to adjust the plurality of aggregate output power setpoints based on a charge restriction enabled for a non-ESS of the one or more non-ESSs, wherein the charge restriction prohibits the non-ESS from charging at least one of the one or more ESSs.

6. The microgrid controller of claim 5, wherein the non-ESS is associated with individual output power setpoints used for calculating the plurality of aggregate output power setpoints,
wherein the one or more processors are configured to:
maintain any individual output power setpoint of the non-ESS that is less than or equal to the total load at preconfigured setpoint values,
adjust any individual output power setpoint of the non-ESS that is greater than the total load to a reduced setpoint value that is equal to the total load to generate one or more charge restricted output power setpoints, and
adjust the plurality of aggregate output power setpoints based on the one or more charge restricted output power setpoints.

7. The microgrid controller of claim 6, wherein each non-ESS of the one or more non-ESSs is associated with a respective set of individual output power setpoints, and
wherein the one or more processors are configured to calculate the plurality of aggregate output power setpoints as a sum of each respective set of individual output power setpoints, including any individual output power setpoint adjusted to a charge restricted output power setpoint.

8. The microgrid controller of claim 4, wherein the one or memories are configured to store a load distribution chart that includes the plurality of aggregate output power setpoints, the plurality of SOC setpoints, the lower dispatch threshold, and the upper dispatch threshold, and wherein the load distribution chart defines one or more charge regions and one or more discharge regions based on the lower dispatch threshold and the upper dispatch threshold.

9. The microgrid controller of claim 8, wherein the one or more processors are configured to determine an operation region in the load distribution chart that corresponds to the total load and the current SOC, and select the operation state that corresponds to the operation region, and
wherein the one or more charge regions and the one or more discharge regions are operation regions from which the operation region is selected.

10. The microgrid controller of claim 8, wherein the load distribution chart defines one or more slow charge regions, one or more idle regions, and one or more slow discharge regions.

11. The microgrid controller of claim 1, wherein the one or more processors are configured to, based on the total load being less than the lower dispatch threshold for the current SOC:
set the aggregate output power to a threshold value of the lower dispatch threshold that corresponds to the current SOC, and
set the operation state of the one or more ESSs to the charging state.

12. The microgrid controller of claim 11, wherein the one or more processors are configured to, based on the total load being less than the lower dispatch threshold for the current SOC:
allocate a portion of the aggregate output power for charging the one or more ESSs, wherein the portion of the aggregate output power is equal to the aggregate output power minus the total load.

13. The microgrid controller of claim 1, wherein the one or more processors are configured to, based on the total load being greater than the upper dispatch threshold for the current SOC:
set the aggregate output power to a threshold value of the upper dispatch threshold that corresponds to the current SOC, and
set the operation state of the one or more ESSs to the discharging state.

14. The microgrid controller of claim 13, wherein the one or more processors are configured to, based on the total load being greater than the upper dispatch threshold for the current SOC:
set an ESS output power of the one or more ESSs to the total load minus the aggregate output power.

15. The microgrid controller of claim 1, wherein the one or more processors are configured to, based on the total load being between the lower dispatch threshold and the upper dispatch threshold for the current SOC:
set the operation state of the one or more ESSs to a slow charging state, an idle state, or a slow discharging state based on the current SOC and the total load.

16. The microgrid controller of claim 15, wherein the one or more processors are configured to, based on the operation state being set to the slow charging state:
set the aggregate output power to a sum of a slow charge configured value and the total load, and
allocate the slow charge configured value for charging the one or more ESSs.

17. The microgrid controller of claim 15, wherein the one or more processors are configured to, based on the operation state being set to the slow discharging state:
set the aggregate output power to the total load minus a slow discharge configured value, and
set an ESS output power of the one or more ESSs to the slow discharge configured value.

18. The microgrid controller of claim 15, wherein the one or more processors are configured to, based on the operation state being set to the idle state:
set the aggregate output power to the total load.

19. The microgrid controller of claim 1, wherein the one or more processors are configured to:
determine a first threshold value of the lower dispatch threshold that corresponds to the current SOC,
determine a second threshold value of the upper dispatch threshold that corresponds to the current SOC, and
compare the total load to at least one of the first threshold value or the second threshold value to determine the relationship of the total load relative to the lower dispatch threshold and the upper dispatch threshold for the current SOC.

20. A control method, comprising:
receiving, by a microgrid controller of a microgrid, load information corresponding to a current load demand of a plurality of loads connected to the microgrid;
receiving, by the microgrid controller, energy resource information corresponding to a plurality of energy resource systems connected to the microgrid, wherein the plurality of energy resource systems includes one or more energy storage systems (ESSs) configured to be charged and discharged, and one or more non-ESSs configured to generate power to be supplied to the microgrid; and
controlling, by the microgrid controller, the plurality of energy resource systems based on the load information, a plurality of state-of-charge (SOC) setpoints corresponding to the one or more ESSs, a lower dispatch threshold that varies based on the plurality of SOC setpoints, and an upper dispatch threshold that varies based on the plurality of SOC setpoints,
wherein controlling the plurality of energy resource systems includes:
calculating a total load allocated to the plurality of energy resource systems based on the load information;
measuring a current SOC of the one or more ESSs;
determining an aggregate output power of the one or more non-ESSs based on a relationship of the total load relative to the lower dispatch threshold and the upper dispatch threshold for the current SOC;
configuring the one or more non-ESSs to provide the aggregate output power; and
setting the one or more ESSs into an operation state of a plurality of operation states based on the relationship of the total load relative to the lower dispatch threshold and the upper dispatch threshold for the current SOC,
wherein the plurality of operation states include a charging state and a discharging state.

* * * * *